United States Patent
Li

(10) Patent No.: US 10,891,239 B2
(45) Date of Patent: Jan. 12, 2021

(54) METHOD AND SYSTEM FOR OPERATING NAND FLASH PHYSICAL SPACE TO EXTEND MEMORY CAPACITY

(71) Applicant: Alibaba Group Holding Limited, Grand Cayman (KY)

(72) Inventor: Shu Li, Bothell, WA (US)

(73) Assignee: Alibaba Group Holding Limited, George Town (KY)

( * ) Notice: Subject to any disclaimer, the term of this patent is extended or adjusted under 35 U.S.C. 154(b) by 0 days.

(21) Appl. No.: 15/891,174

(22) Filed: Feb. 7, 2018

(65) Prior Publication Data

US 2019/0243779 A1 Aug. 8, 2019

(51) Int. Cl.
  *G06F 12/10* (2016.01)
  *G06F 12/1027* (2016.01)

(52) U.S. Cl.
  CPC .. *G06F 12/1027* (2013.01); *G06F 2212/1048* (2013.01); *G06F 2212/2022* (2013.01); *G06F 2212/684* (2013.01)

(58) Field of Classification Search
  CPC ............................. G06F 12/1027; G06F 12/10
  USPC ............................................................. 711/103
  See application file for complete search history.

(56) References Cited

U.S. PATENT DOCUMENTS

| | | | |
|---|---|---|---|
| 4,775,932 A | 10/1988 | Oxley | |
| 5,930,167 A | 7/1999 | Lee | |
| 6,148,377 A | 11/2000 | Carter | |
| 6,226,650 B1 | 5/2001 | Mahajan et al. | |
| 7,565,454 B2 | 7/2009 | Zuberi | |
| 7,958,433 B1 | 6/2011 | Yoon | |
| 8,085,569 B2 | 12/2011 | Kim | |

(Continued)

FOREIGN PATENT DOCUMENTS

| | | |
|---|---|---|
| JP | 1994018634 | 8/1994 |
| JP | 2003022209 | 1/2003 |

(Continued)

OTHER PUBLICATIONS

S. J. Kwon, "Non-volatile translation layer for PCM+NAND in wearable devices," in IEEE Transactions on Consumer Electronics, vol. 63, No. 4, pp. 483-489, Nov. 2017.*

(Continued)

*Primary Examiner* — Pierre Miche Bataille
(74) *Attorney, Agent, or Firm* — Shun Yao; Park, Vaughan, Fleming & Dowler LLP

(57) ABSTRACT

One embodiment facilitates operation of non-volatile memory. During operation, the system determines, by a flash translation layer module, a physical block address associated with a first request which indicates data to be read, wherein the non-volatile memory is divided into separate physical zones, wherein the physical block address is associated with a first physical zone, and each separate physical zone has a dedicated application to read or write data thereto. The system obtains a free page frame in a volatile memory by writing data from a cold page in the volatile memory to a second physical zone, wherein a cold page is a page with a history of access which is less than a predetermined threshold. The system loads, based on the physical block address, data from the non-volatile memory to the free page frame. The system executes the request based on the data loaded into the free page frame.

18 Claims, 10 Drawing Sheets

(56) References Cited

U.S. PATENT DOCUMENTS

| | | |
|---|---|---|
| 8,144,512 B2 | 3/2012 | Huang |
| 8,166,233 B2 | 4/2012 | Schibilla |
| 8,260,924 B2 | 9/2012 | Koretz |
| 8,281,061 B2 | 10/2012 | Radke |
| 8,452,819 B1 | 5/2013 | Sorenson, III |
| 8,516,284 B2 | 8/2013 | Chan |
| 8,751,763 B1 | 6/2014 | Ramarao |
| 8,825,937 B2 | 9/2014 | Atkisson |
| 9,043,545 B2 | 5/2015 | Kimmel |
| 9,088,300 B1 | 7/2015 | Chen |
| 9,092,223 B1 | 7/2015 | Pani |
| 9,280,472 B1 | 3/2016 | Dang |
| 9,280,487 B2 | 3/2016 | Candelaria |
| 9,436,595 B1 | 9/2016 | Benitez |
| 9,529,601 B1 | 12/2016 | Dharmadhikari |
| 9,588,698 B1 | 3/2017 | Karamcheti |
| 9,588,977 B1 | 3/2017 | Wang |
| 10,013,169 B2 | 7/2018 | Fisher |
| 10,229,735 B1 | 3/2019 | Natarajan |
| 10,235,198 B2* | 3/2019 | Qiu .............. G06F 3/061 |
| 2002/0010783 A1 | 1/2002 | Primak |
| 2002/0073358 A1 | 6/2002 | Atkinson |
| 2002/0161890 A1 | 10/2002 | Chen |
| 2003/0163594 A1 | 8/2003 | Aasheim |
| 2003/0163633 A1 | 8/2003 | Aasheim |
| 2003/0217080 A1 | 11/2003 | White |
| 2004/0010545 A1 | 1/2004 | Pandya |
| 2004/0103238 A1 | 5/2004 | Avraham |
| 2004/0255171 A1 | 12/2004 | Zimmer |
| 2004/0268278 A1 | 12/2004 | Hoberman |
| 2005/0038954 A1 | 2/2005 | Saliba |
| 2005/0097126 A1 | 5/2005 | Cabrera |
| 2005/0177755 A1 | 8/2005 | Fung |
| 2005/0195635 A1* | 9/2005 | Conley ............ G06F 12/0862 365/149 |
| 2005/0235067 A1 | 10/2005 | Creta |
| 2005/0235171 A1 | 10/2005 | Igari |
| 2006/0156012 A1 | 7/2006 | Beeson |
| 2007/0033323 A1 | 2/2007 | Gorobets |
| 2007/0061502 A1 | 3/2007 | Lasser |
| 2007/0101096 A1 | 5/2007 | Gorobets |
| 2007/0283081 A1 | 12/2007 | Lasser |
| 2007/0285980 A1 | 12/2007 | Shimizu |
| 2008/0034154 A1 | 2/2008 | Lee |
| 2008/0112238 A1 | 5/2008 | Kim |
| 2008/0301532 A1 | 12/2008 | Uchikawa |
| 2009/0113219 A1 | 4/2009 | Aharonov |
| 2009/0282275 A1 | 11/2009 | Yermalayeu |
| 2009/0307249 A1 | 12/2009 | Koifman |
| 2009/0310412 A1 | 12/2009 | Jang |
| 2010/0169470 A1 | 7/2010 | Takashige |
| 2010/0217952 A1 | 8/2010 | Iyer |
| 2010/0229224 A1 | 9/2010 | Etchegoyen |
| 2010/0325367 A1 | 12/2010 | Kornegay |
| 2011/0055458 A1 | 3/2011 | Kuehne |
| 2011/0055471 A1 | 3/2011 | Thatcher |
| 2011/0099418 A1 | 4/2011 | Chen |
| 2011/0153903 A1 | 6/2011 | Hinkle |
| 2011/0161784 A1 | 6/2011 | Selinger |
| 2011/0191525 A1 | 8/2011 | Hsu |
| 2011/0218969 A1 | 9/2011 | Anglin |
| 2011/0231598 A1 | 9/2011 | Hatsuda |
| 2011/0292538 A1 | 12/2011 | Haga |
| 2011/0299317 A1 | 12/2011 | Shaeffer |
| 2011/0302353 A1 | 12/2011 | Confalonieri |
| 2012/0017039 A1* | 1/2012 | Margetts ............ G06F 12/1009 711/105 |
| 2012/0084523 A1 | 4/2012 | Littlefield |
| 2012/0117399 A1 | 5/2012 | Chan |
| 2012/0147021 A1 | 6/2012 | Cheng |
| 2012/0159289 A1 | 6/2012 | Piccirillo |
| 2012/0210095 A1* | 8/2012 | Nellans ............ G06F 12/10 711/206 |
| 2012/0246392 A1 | 9/2012 | Cheon |
| 2012/0278579 A1 | 11/2012 | Goss |
| 2012/0284587 A1 | 11/2012 | Yu |
| 2013/0061029 A1 | 3/2013 | Huff |
| 2013/0073798 A1 | 3/2013 | Kang |
| 2013/0080391 A1 | 3/2013 | Raichstein |
| 2013/0145085 A1 | 6/2013 | Yu |
| 2013/0145089 A1 | 6/2013 | Eleftheriou |
| 2013/0151759 A1 | 6/2013 | Shim |
| 2013/0159251 A1 | 6/2013 | Skrenta |
| 2013/0166820 A1 | 6/2013 | Batwara |
| 2013/0173845 A1 | 7/2013 | Aslam |
| 2013/0191601 A1 | 7/2013 | Peterson |
| 2013/0219131 A1 | 8/2013 | Alexandron |
| 2013/0318283 A1 | 11/2013 | Small |
| 2014/0019650 A1 | 1/2014 | Li |
| 2014/0082273 A1 | 3/2014 | Segev |
| 2014/0095827 A1* | 4/2014 | Wei .............. G06F 12/0246 711/203 |
| 2014/0108414 A1 | 4/2014 | Stillerman |
| 2014/0181532 A1 | 6/2014 | Camp |
| 2014/0195564 A1 | 7/2014 | Talagala |
| 2014/0233950 A1 | 8/2014 | Luo |
| 2014/0250259 A1 | 9/2014 | Ke |
| 2014/0279927 A1 | 9/2014 | Constantinescu |
| 2014/0304452 A1 | 10/2014 | De La Iglesia |
| 2014/0310574 A1 | 10/2014 | Yu |
| 2014/0359229 A1 | 12/2014 | Cota-Robles |
| 2014/0365707 A1 | 12/2014 | Talagala |
| 2015/0019798 A1 | 1/2015 | Huang |
| 2015/0082317 A1 | 3/2015 | You |
| 2015/0106556 A1 | 4/2015 | Yu |
| 2015/0106559 A1 | 4/2015 | Cho |
| 2015/0142752 A1 | 5/2015 | Chennamsetty |
| 2015/0227316 A1* | 8/2015 | Warfield ............ G06F 3/0611 711/103 |
| 2015/0277937 A1 | 10/2015 | Swanson |
| 2015/0301964 A1 | 10/2015 | Brinicombe |
| 2015/0304108 A1 | 10/2015 | Obukhov |
| 2015/0363271 A1 | 12/2015 | Haustein |
| 2015/0372597 A1 | 12/2015 | Luo |
| 2016/0014039 A1 | 1/2016 | Reddy |
| 2016/0026575 A1 | 1/2016 | Samanta |
| 2016/0048341 A1 | 2/2016 | Constantinescu |
| 2016/0098344 A1 | 4/2016 | Gorobets |
| 2016/0110254 A1 | 4/2016 | Cronie |
| 2016/0162187 A1 | 6/2016 | Lee |
| 2016/0179399 A1 | 6/2016 | Melik-Martirosian |
| 2016/0203000 A1 | 7/2016 | Parmar |
| 2016/0232103 A1 | 8/2016 | Schmisseur |
| 2016/0239074 A1 | 8/2016 | Lee |
| 2016/0239380 A1 | 8/2016 | Wideman |
| 2016/0274636 A1 | 9/2016 | Kim |
| 2016/0306853 A1 | 10/2016 | Sabaa |
| 2016/0343429 A1 | 11/2016 | Nieuwejaar |
| 2016/0350002 A1 | 12/2016 | Vergis |
| 2016/0350385 A1 | 12/2016 | Poder |
| 2016/0364146 A1 | 12/2016 | Kuttner |
| 2017/0010652 A1 | 1/2017 | Huang |
| 2017/0075583 A1* | 3/2017 | Alexander ............ G06F 3/0605 |
| 2017/0075594 A1* | 3/2017 | Badam ............ G06F 3/0605 |
| 2017/0109232 A1 | 4/2017 | Cha |
| 2017/0132268 A1* | 5/2017 | Li .............. G06F 16/2322 |
| 2017/0147499 A1* | 5/2017 | Mohan ............ G06F 12/10 |
| 2017/0161202 A1 | 6/2017 | Erez |
| 2017/0162235 A1* | 6/2017 | De .............. G11C 7/1072 |
| 2017/0168986 A1 | 6/2017 | Sajeepa |
| 2017/0212708 A1 | 7/2017 | Suhas |
| 2017/0220254 A1* | 8/2017 | Warfield ............ G06F 3/0643 |
| 2017/0228157 A1 | 8/2017 | Yang |
| 2017/0249162 A1 | 8/2017 | Tsirkin |
| 2017/0262178 A1 | 9/2017 | Hashimoto |
| 2017/0285976 A1 | 10/2017 | Durham |
| 2017/0286311 A1 | 10/2017 | Juenemann |
| 2017/0344470 A1 | 11/2017 | Yang |
| 2017/0344491 A1 | 11/2017 | Pandurangan |
| 2017/0353576 A1 | 12/2017 | Guim Bernat |
| 2018/0024772 A1 | 1/2018 | Madraswala |
| 2018/0024779 A1 | 1/2018 | Kojima |
| 2018/0088867 A1 | 3/2018 | Kaminaga |
| 2018/0107591 A1 | 4/2018 | Smith |

(56) References Cited

U.S. PATENT DOCUMENTS

| | | | |
|---|---|---|---|
| 2018/0121351 A1* | 5/2018 | Zhang | G11C 8/06 |
| 2018/0143780 A1 | 5/2018 | Cho | |
| 2018/0167268 A1 | 6/2018 | Liguori | |
| 2018/0189182 A1 | 7/2018 | Wang | |
| 2018/0212951 A1 | 7/2018 | Goodrum | |
| 2018/0232151 A1* | 8/2018 | Badam | G06F 3/0632 |
| 2018/0270110 A1 | 9/2018 | Chugtu | |
| 2018/0293014 A1 | 10/2018 | Ravimohan | |
| 2018/0329776 A1 | 11/2018 | Lai | |
| 2018/0356992 A1 | 12/2018 | Lamberts | |
| 2018/0373428 A1 | 12/2018 | Kan | |
| 2019/0004968 A1* | 1/2019 | Gao | G06F 12/128 |
| 2019/0012111 A1 | 1/2019 | Li | |
| 2019/0073262 A1 | 3/2019 | Chen | |
| 2019/0205206 A1 | 7/2019 | Hornung | |

FOREIGN PATENT DOCUMENTS

| | | |
|---|---|---|
| JP | 2011175422 | 9/2011 |
| WO | 9418634 | 8/1994 |

OTHER PUBLICATIONS

Y. Luo, Y. Cai, S. Ghose, J. Choi and O. Mutlu, "WARM: Improving NAND flash memory lifetime with write-hotness aware retention management," 2015 31st Symposium on Mass Storage Systems and Technologies (MSST), Santa Clara, CA, 2015, pp. 1-14.*

S. Jung, Y. Lee and Y. H. Song, "A process-aware hot/cold identification scheme for flash memory storage systems," in IEEE Transactions on Consumer Electronics, vol. 56, No. 2, pp. 339-347, May 2010.* https://web.archive.org/web/20071130235034/http://en.wikipedia.org:80/wiki/logical_block_addressing wikipedia screen shot retriefed on wayback Nov. 20, 2007 showing both physical and logical addressing used historically to access data on storage devices (Year: 2007).

Ivan Picoli, Carla Pasco, Bjorn Jonsson, Luc Bouganim, Philippe Bonnet. "uFLIP-OC: Understanding Flash I/O Patterns on Open-Channel Solid-State Drives." APSys'17, Sep. 2017, Mumbai, India. pp. 1-7, 2017, <10.1145/3124680.3124741>. <hal-01654985>.

EMC Powerpath Load Balancing and Failover Comparison with native MPIO operating system solutions. Feb. 2011.

Tsuchiya, Yoshihiro et al. "DBLK: Deduplication for Primary Block Storage", MSST 2011, Denver, CO, May 23-27, 2011 pp. 1-5.

Chen Feng, et al. "CAFTL: A Content-Aware Flash Translation Layer Enhancing the Lifespan of Flash Memory based Solid State Devices"< FAST '11, San Jose, CA Feb. 15-17, 2011, pp. 1-14.

Wu, Huijun et al. "HPDedup: A Hybrid Prioritized Data Deduplication Mechanism for Primary Storage in the Cloud", Cornell Univ. arXiv: 1702.08153v2[cs.DC], Apr. 16, 2017, pp. 1-14.

WOW: Wise Ordering for Writes—Combining Spatial and Temporal Locality in Non-Volatile Caches by Gill (Year: 2005).

Helen H. W. Chan et al. "HashKV: Enabling Efficient Updated in KV Storage via Hashing", https://www.usenix.org/conference/atc18/presentation/chan, (Year: 2018).

S. Hong and D. Shin, "NAND Flash-Based Disk Cache Using SLC/MLC Combined Flash Memory," 2010 International Workshop on Storage Network Architecture and Parallel I/Os, Incline Village, NV, 2010, pp. 21-30.

Arpaci-Dusseau et al. "Operating Systems: Three Easy Pieces", Originally published 2015; Pertinent: Chapter 44; flash-based SSDs, available at http://pages.cs.wisc.edu/~remzi/OSTEP/.

* cited by examiner

METHOD AND SYSTEM FOR OPERATING NAND FLASH PHYSICAL SPACE TO EXTEND MEMORY CAPACITY

BACKGROUND

Field

This disclosure is generally related to the field of data storage. More specifically, this disclosure is related to a method and system for operating NAND flash physical space to extend the memory capacity of a server.

Related Art

The proliferation of the Internet and e-commerce continues to create a vast amount of digital content. Various storage systems and servers have been created to access and store such digital content. A storage system or server can include volatile memory (e.g., dynamic random access memory (DRAM) and multiple drives (e.g., a solid state drive (SSD)). A drive can include non-volatile memory for persistent storage (e.g., NAND flash). The memory in a server plays a crucial role in the performance and capacity of a storage system. As current applications require an increasing amount of memory, the amount of memory in the server (e.g., DRAM) can limit the overall performance of the system. For example, a single central processing unit (CPU) socket can only support a limited number of dual in-line memory module (DIMM) slots, and a single DIMM has a limited capacity. Furthermore, a limited supply of DRAM can result in an increased cost, which can affect both the DRAM supply available for use in a data center and the total cost of ownership (TCO).

Thus, the limited availability and capacity of memory in a server may create a bottleneck in the performance of the server, and may also create challenges for a reduced TCO in light of the increasing scale of data centers.

SUMMARY

One embodiment facilitates operation of non-volatile memory. During operation, the system determines, by a flash translation layer module, a physical block address associated with a first request which indicates data to be read, wherein the non-volatile memory is divided into separate physical zones, wherein the physical block address is associated with a first physical zone, and wherein each of the separate physical zones has a dedicated application to read or write data thereto.

In some embodiments, the system divides the non-volatile memory into the separate physical zones. A separate physical zone includes one or more NAND dies, and an application corresponds to a unique physical zone.

In some embodiments, the system determines, by the flash translation layer module, another physical block address associated with a second request which indicates data to be written, wherein the other physical block address is associated with a third physical zone which is not currently processing a read operation or an erase operation.

In some embodiments, the method is performed in response to: performing an unsuccessful first search in a translation lookaside buffer for an existing physical block address in the volatile memory associated with the requested data; and performing an unsuccessful second search in a page table for the existing physical block address.

In some embodiments, in response to performing a successful first search in the translation lookaside buffer, or in response to performing the unsuccessful first search in the translation lookaside buffer and performing a successful second search in the page table, the system executes the request based on data associated with the existing physical block address in the volatile memory.

In some embodiments, obtaining the free page frame in the volatile memory is responsive to successfully allocating an available page frame in the volatile memory.

In some embodiments, obtaining the free page frame and loading the data from the non-volatile memory to the free page frame is responsive to unsuccessfully allocating an available page frame in the volatile memory.

In some embodiments, the system determines a cold page in a volatile memory, wherein the cold page is a page with a history of access which is less than a predetermined threshold, and wherein the predetermined threshold is based on a number of times that the page has been accessed within a predetermined period of time. The system obtains a free page frame in the volatile memory by writing data from the cold page in the volatile memory to a second physical zone. The system loads, based on the physical block address, data from the non-volatile memory to the free page frame. The system executes the request based on the data loaded into the free page frame.

In some embodiments, the system determines a hot page in the non-volatile memory, wherein the hot page is a page with a history of access which is greater than a predetermined threshold, and wherein the predetermined threshold is based on a number of times that the page has been accessed within a predetermined period of time. The system loads, based on a physical block address for the hot page in the non-volatile memory, data from the non-volatile memory to the volatile memory.

In some embodiments, the flash translation layer module operates in a user space.

BRIEF DESCRIPTION OF THE FIGURES

In the figures, like reference numerals refer to the same figure elements.

DETAILED DESCRIPTION

Figure 1:
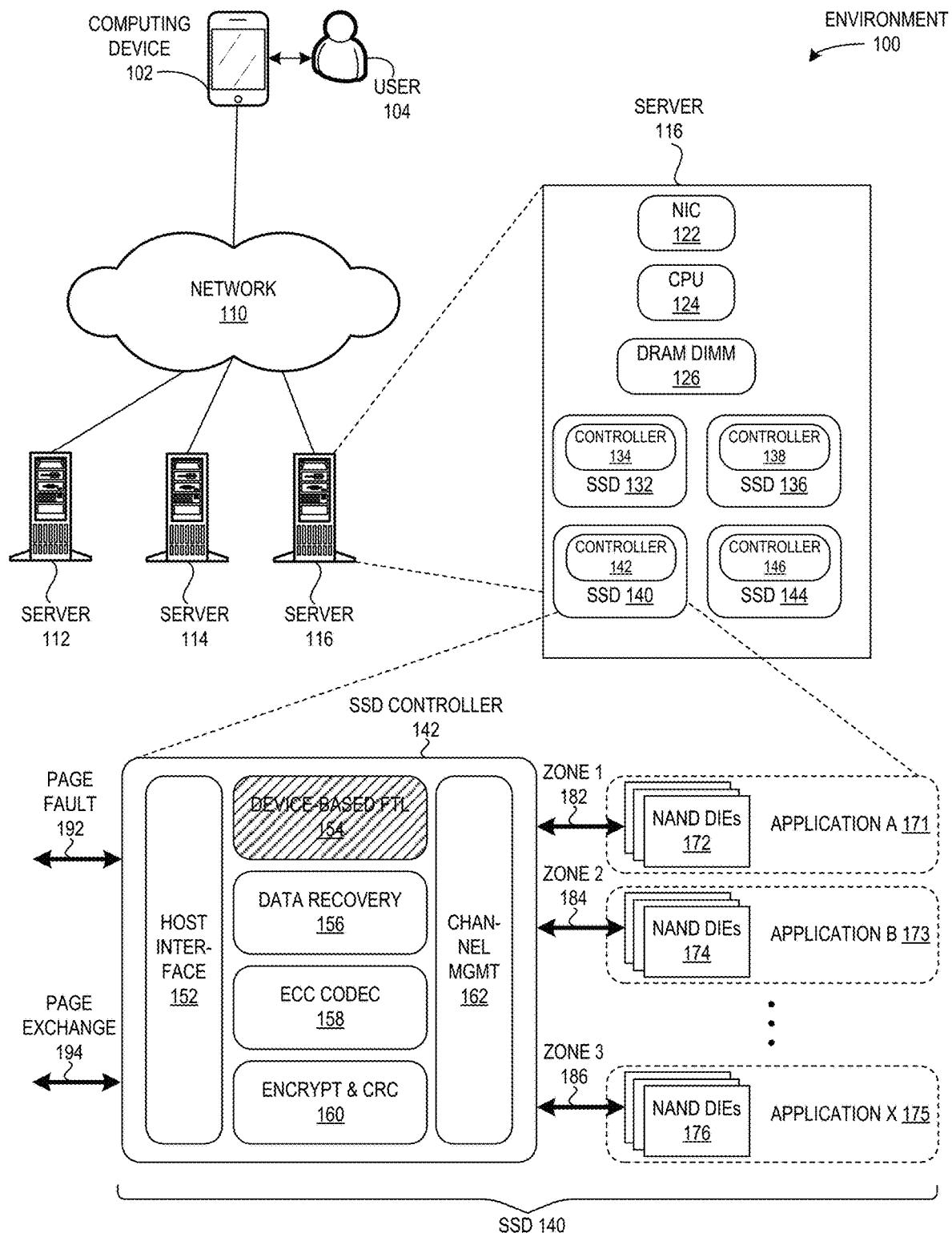
FIG. 1 illustrates an exemplary environment that facilitates operation of non-volatile memory, in accordance with an embodiment of the present application.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.

Overview

The embodiments described herein provide a system which solves the problem of the performance bottleneck resulting from limited memory in a server (e.g., DRAM) by extending the memory capacity of the server. As current applications require an increasing amount of memory, the availability and capacity of server memory (e.g., DRAM) can significantly impact the overall performance and cost of the system. The limited DRAM can create a bottleneck in the performance of a server, and can also result in challenges in reducing the TCO as the scale of data centers continues to increase.

The embodiments described herein address these inefficiencies by operating the non-volatile memory of a server's drive (e.g., NAND). The system divides the NAND physical media into separate physical zones to handle application-specific requests. The system also implements a host-based flash translation layer (FTL) (e.g., in the user space) which maps logical block addresses (LBAs) to physical block addresses (PBAs) (the "LBA→PBA mapping"), and uses the mapping to operate the non-volatile memory, which extends the memory capacity of the server.

To handle an incoming read request, the system can check the translation lookaside buffer (TLB) and, if needed, the page table, to determine if the requested data is in the DRAM, and retrieve the requested data directly from the DRAM. If the requested data is not found in either the TLB or the page table, the system can generate a page fault, and the user space FTL can determine the PBA corresponding to the requested data (e.g., based on an LBA→PBA mapping for the requested data). The PBA is associated with a first physical zone of the NAND physical media. The user space FTL can then load the requested data from the first physical zone to the DRAM. As part of this process, the system must allocate sufficient DRAM space to which to load the requested data. If sufficient space does not exist in the DRAM, the system can determine and move "cold" pages from the DRAM to the NAND to free up or make available page frames to which to write the requested data. In some embodiments, the system can also determine and move "hot" pages from the NAND to the DRAM. A cold page can be a page with a history of access which is less than a predetermined threshold, while a hot page can be a page with a history of access which is greater than the predetermined threshold. This threshold can be based on various factors, e.g., a number of times that a page has been accessed within a predetermined period of time.

Furthermore, if the system determines to move a cold page from the DRAM to the NAND in order to load the requested data to the DRAM, the system can move the cold page data to a second physical zone in the NAND. The second physical zone is separate from the first physical zone associated with the read request. By keeping the zones separate, the two operations (reading the data from the PBA in the NAND, and writing the cold page data from the DRAM to the NAND) can occur in parallel.

Thus, the embodiments described herein provide a system which improves the efficiency and performance of a storage system. By implementing the FTL in the user space and by dividing the physical media into application-specific zones, the system allows the user space FTL to perform memory extension and page translation functionality. The separate physical zones allow the system to process an incoming read request (of data located in the non-volatile memory, e.g., NAND) in parallel with a write operation (of moving data from a cold page in the DRAM to the NAND), which frees up DRAM space for loading the requested data from the NAND. Thus, the system can avoid the bottleneck created by limited DRAM capacity in the server of a storage system.

Exemplary Environment and Network

FIG. 1 illustrates an exemplary environment 100 that facilitates operation of non-volatile memory, in accordance with an embodiment of the present application. Environment 100 can include a computing device 102 and an associated user 104. Computing device 102 can communicate via a network 110 with storage servers 112, 114, and 116, which can be part of a distributed storage system and accessed via client servers (not shown). A storage server can include multiple storage drives, and each drive can include a controller and multiple physical media for data storage. For example, server 116 can include a network interface card (NIC) 122, a CPU 124, a DRAM DIMM 126, and SSDs 132, 136, 140, and 144 with, respectively, controllers 134, 138, 142, and 146.

A drive can include physical media which has been divided into separate physical zones, which allows for concurrent operations in different physical zones, and obviates the need to tie up system resources waiting for concurrent operations in the same physical NAND die. For example, SSD controller 142 of SSD 140 can include a host interface 152, a device-based FTL module 154, a data recovery module 156, an error correction (ECC) codec module 158, an encrypt & cyclic redundancy check (CRC) module 160, and a channel management module 162.

SSD 140 can also include NAND dies 172, 174, and 176, which are each associated with separate and different physical zones. The system can determine that a requested read operation is to be performed on physical media in a zone different from a zone in which other concurrent operations are to be performed (e.g., as described below in relation to FIG. 5C for moving cold page data from DRAM to NAND). The system can also determine that a subsequent program or erase operation is to be performed on physical media in a zone different from the zone which is processing the ongoing read operation.

During operation, an FTL module in the host space can handle a page fault and a page exchange (as described below in relation to FIGS. 3 and 4) without involving device-based FTL 154 of SSD 140. Host interface 152 can communicate with a host (e.g., a user space FTL) to obtain a specific PBA, and channel management 162 can send a command to be executed on the specific PBA in its specific zone. An application can be assigned to or associated with a specific zone. For example: application A 171 can be associated with zone 1, which can include NAND dies 172 and be accessed via a communication 182; application B 173 can be associated with zone 2, which can include NAND dies 174 and be accessed via a communication 184; and application X 175 can be associated with zone 3, which can include NAND dies 176 and be accessed via a communication 186. Thus, the host-based FTL can use the LBA→PBA mapping (i.e., a given PBA) to directly operate on the physical media based on the specific zone associated with the given PBA.

Figure 2A:
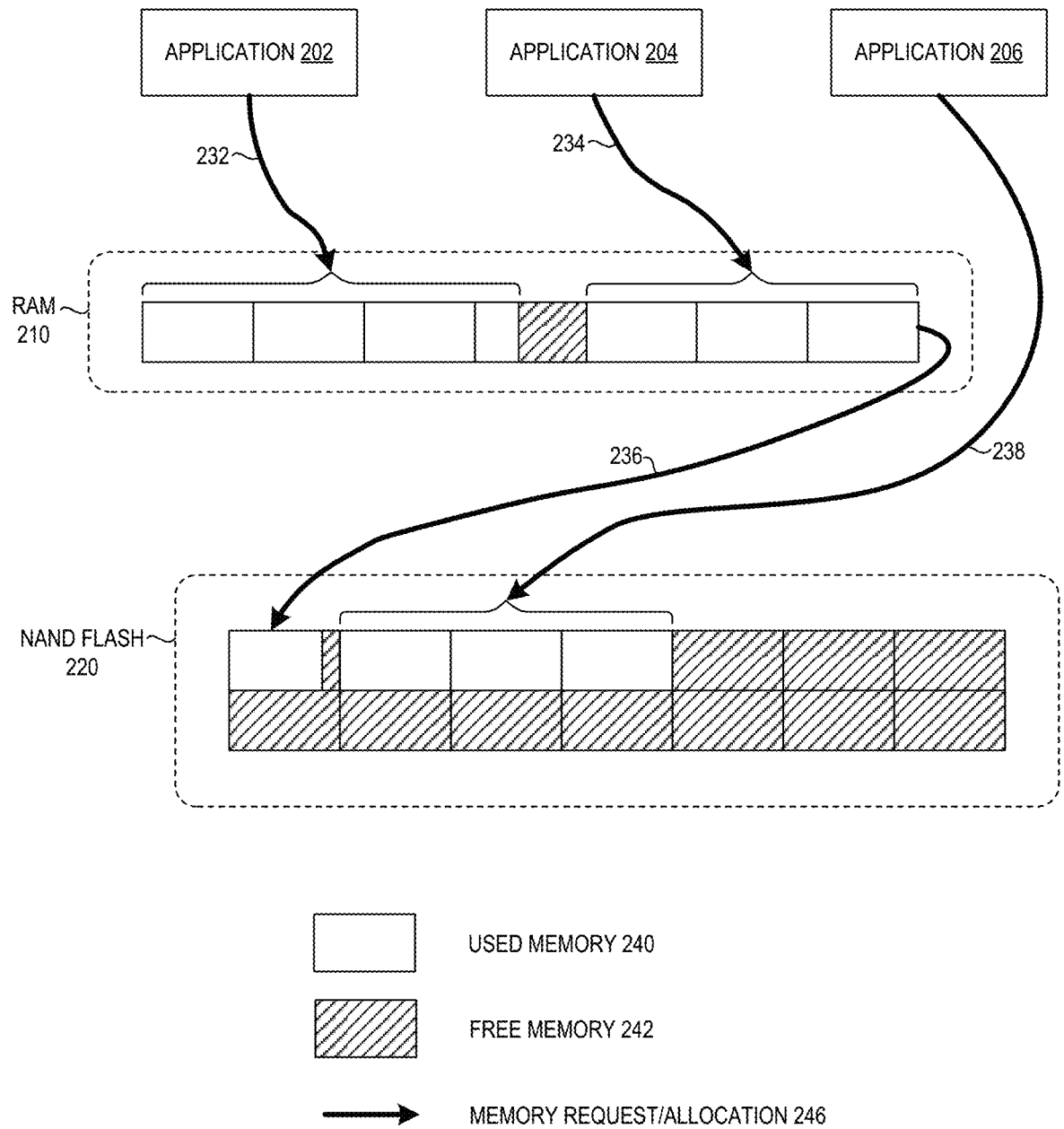
FIG. 2A illustrates an exemplary memory allocation, in accordance with the prior art.

FIG. 2A illustrates an exemplary memory allocation, in accordance with the prior art. Used memory is indicated by blank boxes (e.g., used memory 240), and free or available memory is indicated by diagonally striped lines (e.g., free memory 242). A memory request/allocation is indicated by a thick line (e.g., 246). Different applications (e.g., applications 202, 204, and 206) may initiate a request for memory, which can cause the system to allocate a certain amount of memory in the volatile memory (e.g., RAM 210) of the server. When there is no longer sufficient space in volatile memory, the system can allocate memory in the non-volatile memory (e.g., NAND flash 220) of the drive. For example, application 202 can send a request 232, which results in a memory allocation and data being stored in RAM 210. Application 204 can send a request 234, which results in a memory allocation and some data being stored in RAM 210 and the remainder of the data from application 204 stored in NAND flash 220 (via a request 236). Application 206 can send a request 238, which results in a memory allocation and all of the data from application 206 being stored in NAND flash 220.

However, the latency involved in writing data to an SSD (e.g., the physical media of NAND flash 220) can be approximately three to four times greater than the latency involved in writing data to the DRAM (e.g., RAM 210). Furthermore, because an SSD may not be as stable as DRAM, this can result in performance issues, where some I/O operations are likely to experience a significantly longer latency, as described below in relation to FIG. 2B.

Figure 2B:
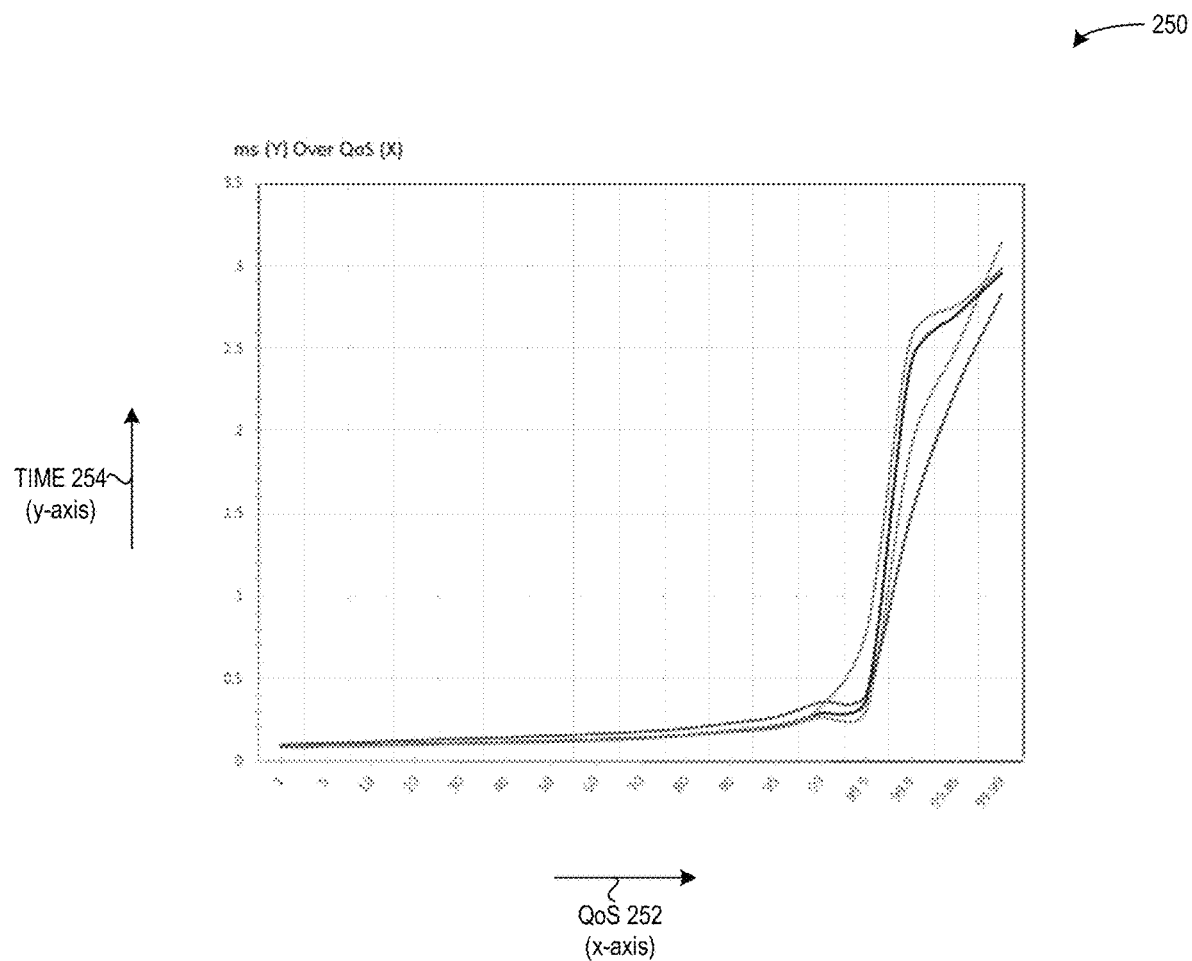
FIG. 2B illustrates a graph which depicts the read latency distribution for several conventional SSDs, in accordance with the prior art.

FIG. 2B illustrates a graph 250 which depicts the read latency distribution for several conventional SSDs, in accordance with the prior art. Graph 250 includes a Quality of Service (QoS) 252 (x-axis) and a time 254 (y-axis), and indicates the time (in milliseconds) over the QoS. As depicted in graph 250, each line corresponds to a conventional SSD. A long tail latency exists for each of these conventional SSDs, and occurs mainly due to operation conflicts on the same physical NAND module. Thus, while one operation is in process, another operation cannot be carried out in parallel on the same physical NAND media module.

Communication in an Exemplary Architecture and Environment for Facilitating Operation of Non-Volatile Memory The embodiments described herein provide a system which addresses the long latency involved in writing data to an SSD (as shown in FIGS. 2A and 2B). The system implements the FTL in the user space, and also divides the physical media of the SSD (e.g., NAND dies of the non-volatile memory) into separate physical zones. This allows an operation in one physical zone to occur in parallel with another operation in a separate physical zone.

Figure 3:
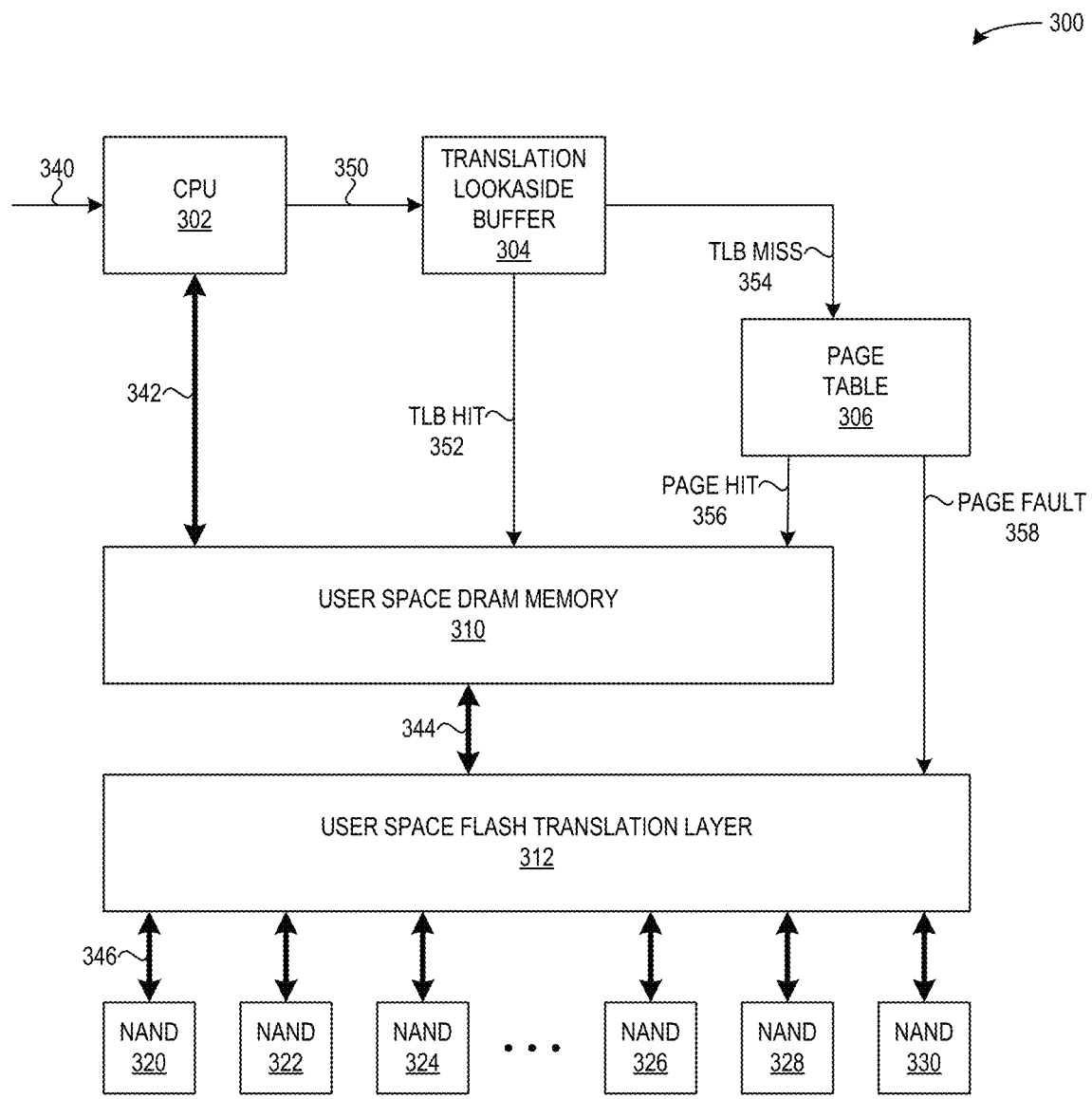
FIG. 3 illustrates an exemplary architecture that facilitates operation of non-volatile memory, in accordance with the prior art.

FIG. 3 illustrates an exemplary architecture 300 that facilitates operation of non-volatile memory, in accordance with the prior art. Architecture 300 can include a CPU 302, a translation lookaside buffer (TLB) 304, a page table 306, a user space DRAM memory 310, a user space flash translation layer (FTL) 312, and NANDs 320-330. During operation, CPU 302 can receive a request which indicates data to be read (via, e.g., a communication 340). CPU 302 can determine whether the requested data is currently stored in DRAM 310 (via a communication 342). The system can perform a first search in TLB 304 for an existing PBA in DRAM 310 which is associated with the requested data (via, e.g., a communication 350). If the TLB search is successful, the system can retrieve the data directly from DRAM 310 (as indicated by a TLB hit 352 communication). If the TLB search is not successful, the system can perform a second search in page table 306 for the existing PBA in DRAM 310 which is associated with the requested data (via, e.g., a TLB miss 354 communication). If the page table search is successful, the system can retrieve the data directly from DRAM 310 (as indicated by a page hit 356 communication). If the page table search is not successful, the system can generate a page fault (via, e.g., a communication 358), and request the data from FTL 312.

FTL 312 can operate on NANDs 320-330 directly by communicating with NANDs 320-330 based on a given PBA. For example, FTL 312 can search its LBA→PBA mapping to determine that the physical block address associated with the requested data is part of NAND 320, which is assigned to a specific physical zone ("first physical zone").

The system can also allocate sufficient space (e.g., an available or free page frame) in DRAM 310, to which to load the requested data from NAND 320 via FTL 312. Allocating sufficient space can include determining one or more cold pages in the DRAM 310, moving the data from the cold page to a physical zone different from the first physical zone ("second physical zone"), making available a page frame of the cold page, and moving the requested data from NAND 320 to the available page frame in DRAM 310 (as described below in relation to FIG. 5C). Thus, the system maintains separate physical zones of the non-volatile memory: a first physical zone from which to read the requested data on NAND 320; and a second physical zone to which to load the cold page data from DRAM 310, where the second physical zone is a zone which does not include NAND 320. By dividing the non-volatile memory into separate physical zones, the system can ensure that two simultaneously occurring operations do not attempt to access the same NAND die, thus reducing conflicts and decreasing the latency involved in waiting for and accessing the same NAND die.

Figure 4:
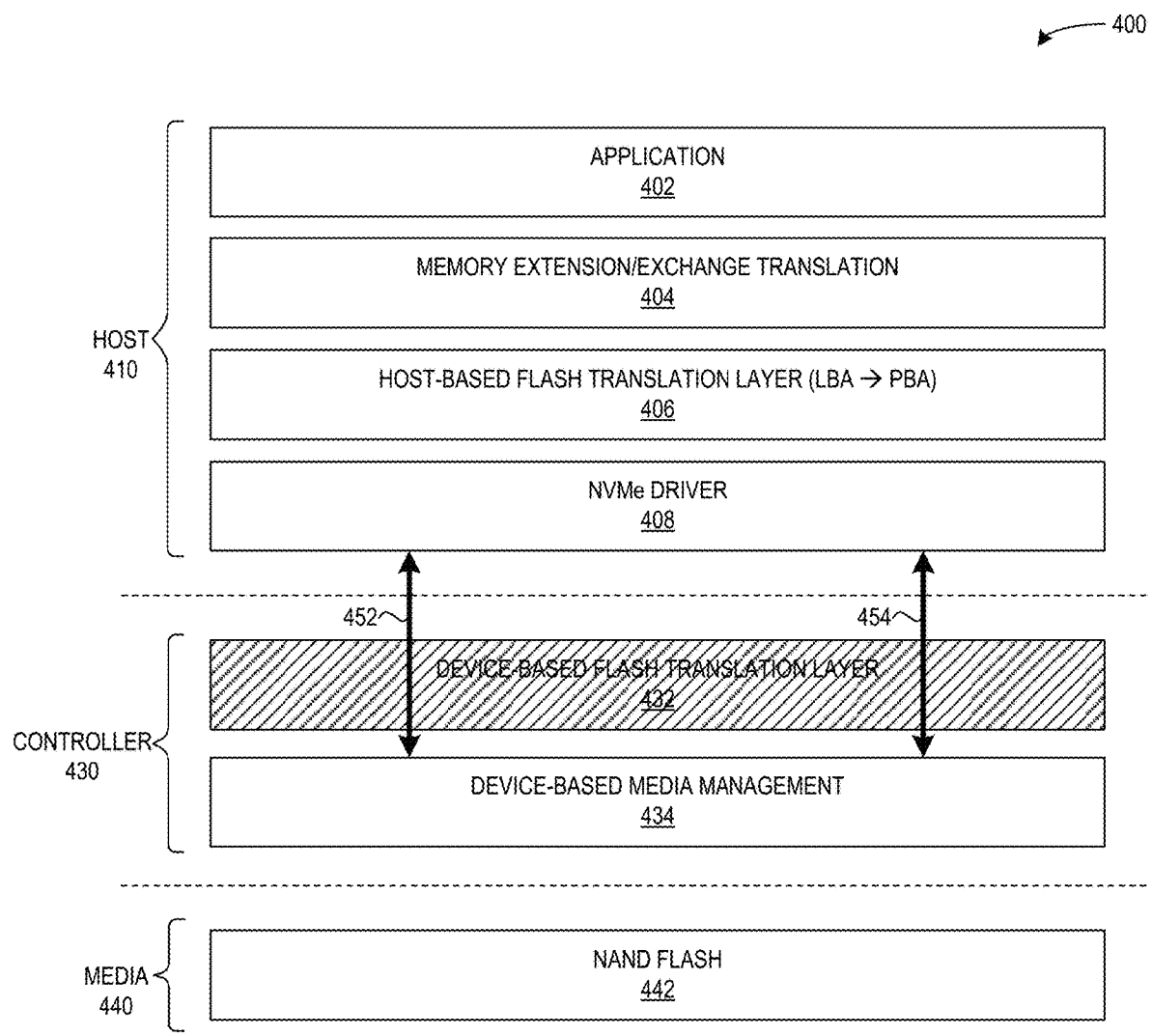
FIG. 4 illustrates an exemplary environment that facilitates operation of non-volatile memory, in accordance with an embodiment of the present application.

FIG. 4 illustrates an exemplary environment 400 that facilitates operation of non-volatile memory, in accordance with an embodiment of the present application. Environment 400 depicts a system hierarchy which can include a host 410 (e.g., a user space), a controller 430 (e.g., of an SSD), and a media 440 (e.g., NAND flash 442). Host 410 can include an application 402, a memory extension/exchange translation module 404, a host-based flash translation layer (LBA→PBA) 406, and a Non-Volatile Memory Express (NVMe) driver 408. Controller 430 can include a device-based flash translation layer 432 (shown with diagonal lines to indicate that it is not being used) and a device-based media management 434.

During operation, memory extension/exchange translation module 404 and host-based FTL 406 can perform the functionality described in relation to user space FTL 312 of FIG. 3, including: searching for the requested data in the DRAM; and, if the data is not in the DRAM but is in the NAND, determining the LBA→PBA mapping, making sufficient space available in the DRAM by moving cold pages out to the NAND, and writing the data from the NAND to the DRAM based on the determined PBA. In some embodiments, the system can also identify and move "hot" pages from the NAND to the DRAM for more efficient access to serve a subsequent I/O request, which can improve the performance of the system.

Thus, environment 400 depicts how the system can bypass device-based FTL 432 (e.g., via a communication 452 which can pass the determined PBA as needed), and further expose the NAND flash directly to host 410 (e.g., via a communication 454). Note that controller 430 uses device-based media management 434 to ensure the lifespan and efficient usage of the media 440. This enables the native SSDs to function properly while bypassing the device-based FTL 432. Thus, the host-based FTL (404) with the memory extension functionality (406) enables the system to directly manage and operate on the exposed flash media.

Method for Facilitating Operation of Non-Volatile Memory

Figure 5A:
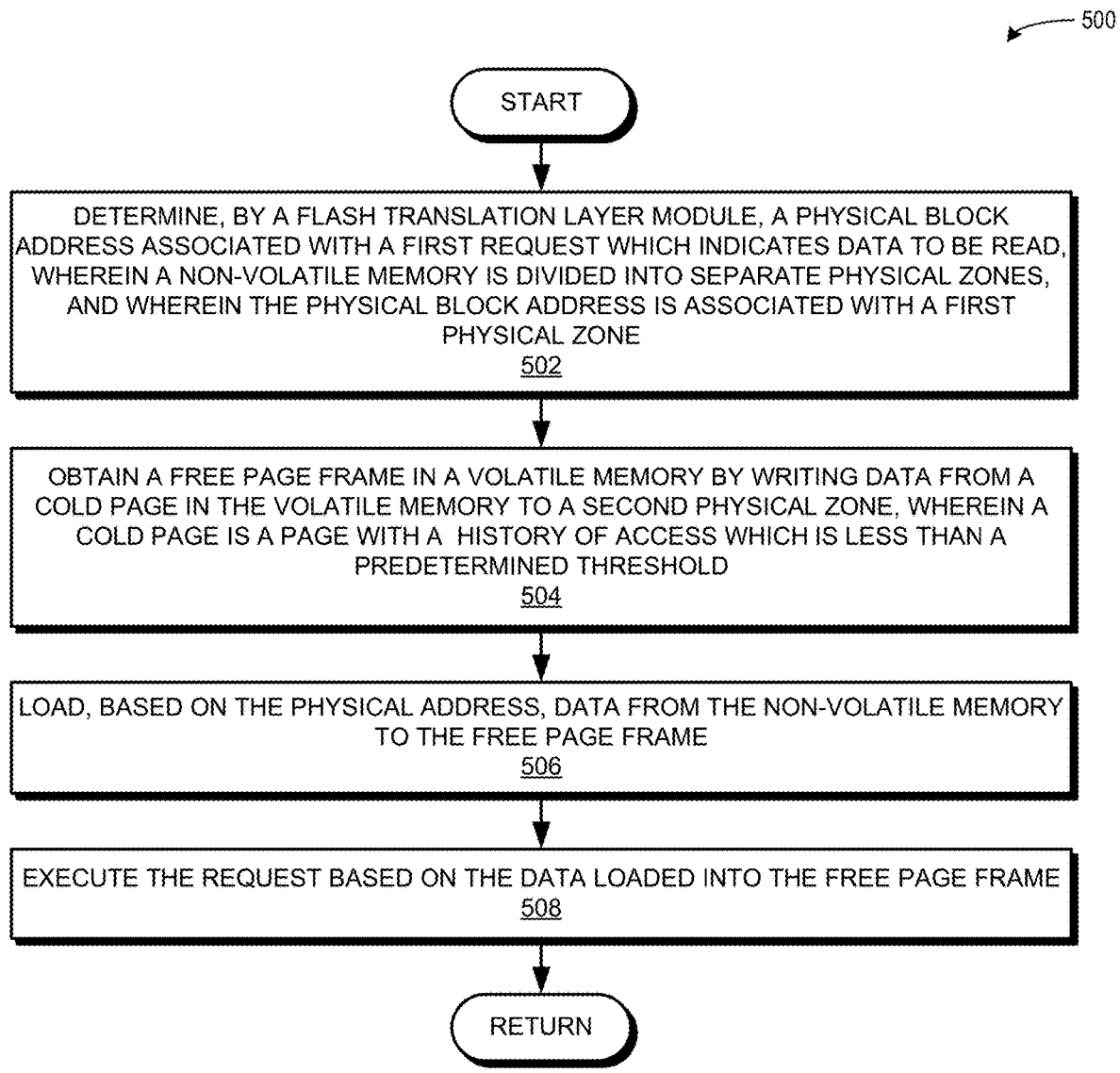
FIG. 5A presents a flowchart illustrating a method for facilitating operation of non-volatile memory, in accordance with an embodiment of the present application.

FIG. 5A presents a flowchart 500 illustrating a method for facilitating operation of non-volatile memory, in accordance with an embodiment of the present application. During operation, the system determines, by a flash translation layer module, a physical block address associated with a first request which indicates data to be read, wherein a non-volatile memory is divided into separate physical zones, and wherein the physical block address is associated with a first physical zone (operation 502). Each of the separate physical zones has a dedicated application to read or write data thereto. The system obtains a free page frame in a volatile memory by writing data from a cold page in the volatile memory to a second physical zone, wherein a cold page is a page with a history of access which is less than a predetermined threshold (operation 504). The system loads, based on the physical address, data from the non-volatile memory to the free page frame (operation 506). The system executes the request based on the data loaded into the free page frame (operation 508).

Figure 5B:
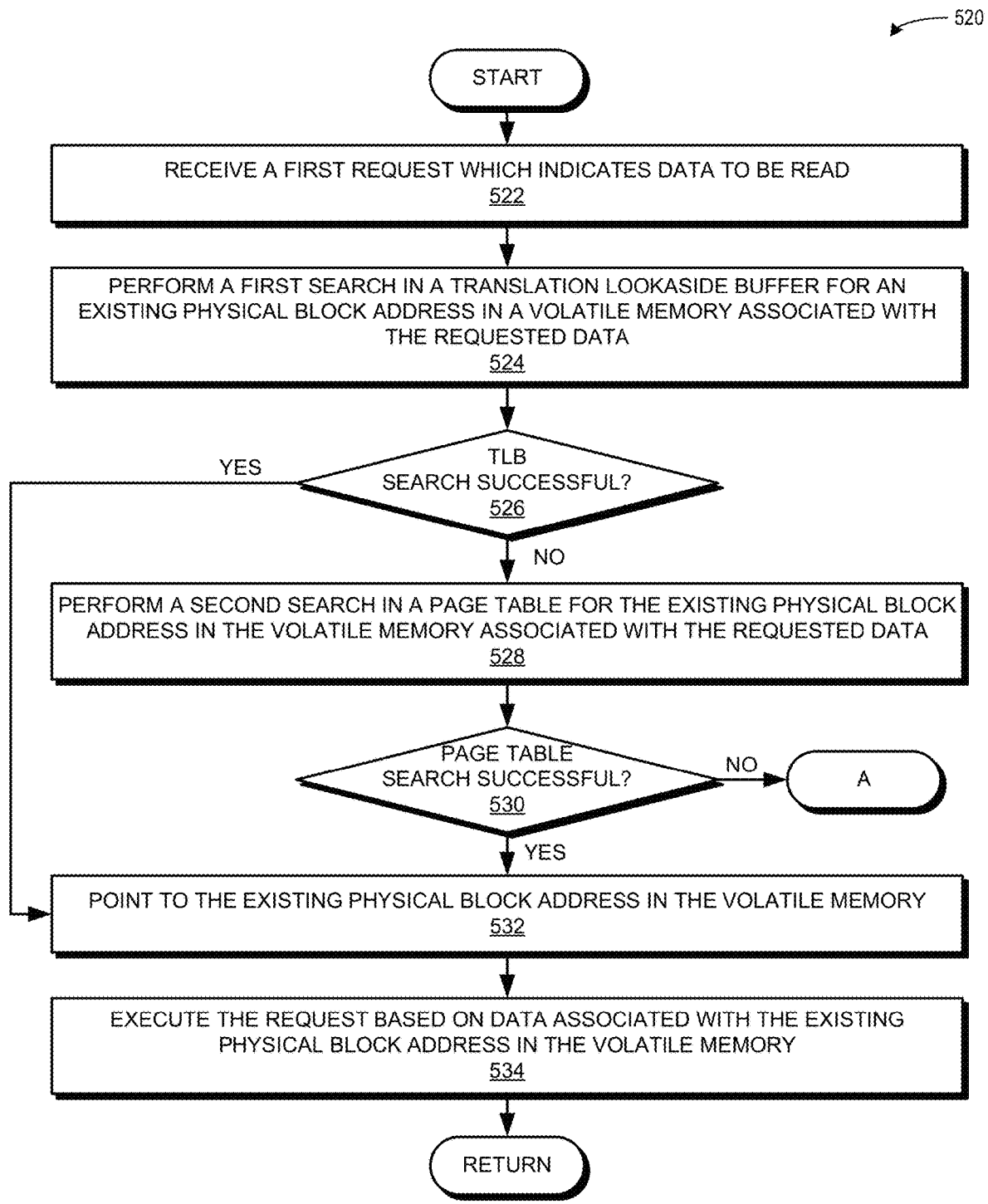
FIG. 5B presents a flowchart illustrating a method for facilitating operation of non-volatile memory, in accordance with an embodiment of the present application.

FIG. 5B presents a flowchart 520 illustrating a method for facilitating operation of non-volatile memory, in accordance with an embodiment of the present application. During operation, the system receives a first request which indicates data to be read (operation 522). The system performs a first search in a translation lookaside buffer (TLB) for an existing physical block address in a volatile memory associated with the requested data (operation 524). If the TLB search is successful (decision 526) (i.e., indicating a TLB hit), the system points to the existing physical block address in the volatile memory (operation 532). If the TLB search is not successful (decision 526) (i.e., indicating a TLB miss), the system performs a second search in a page table for the existing physical block address in the volatile memory associated with the requested data (operation 528). If the page table search is not successful (decision 530) (i.e., indicating a page fault), the operation continues as described at Label A of FIG. 5C. If the page table search is successful (decision 530) (i.e., indicating a page hit), the system points to the existing physical block address in the volatile memory (operation 532). The system executes the request based on data associated with the physical block address in the volatile memory (operation 534).

Figure 5C:
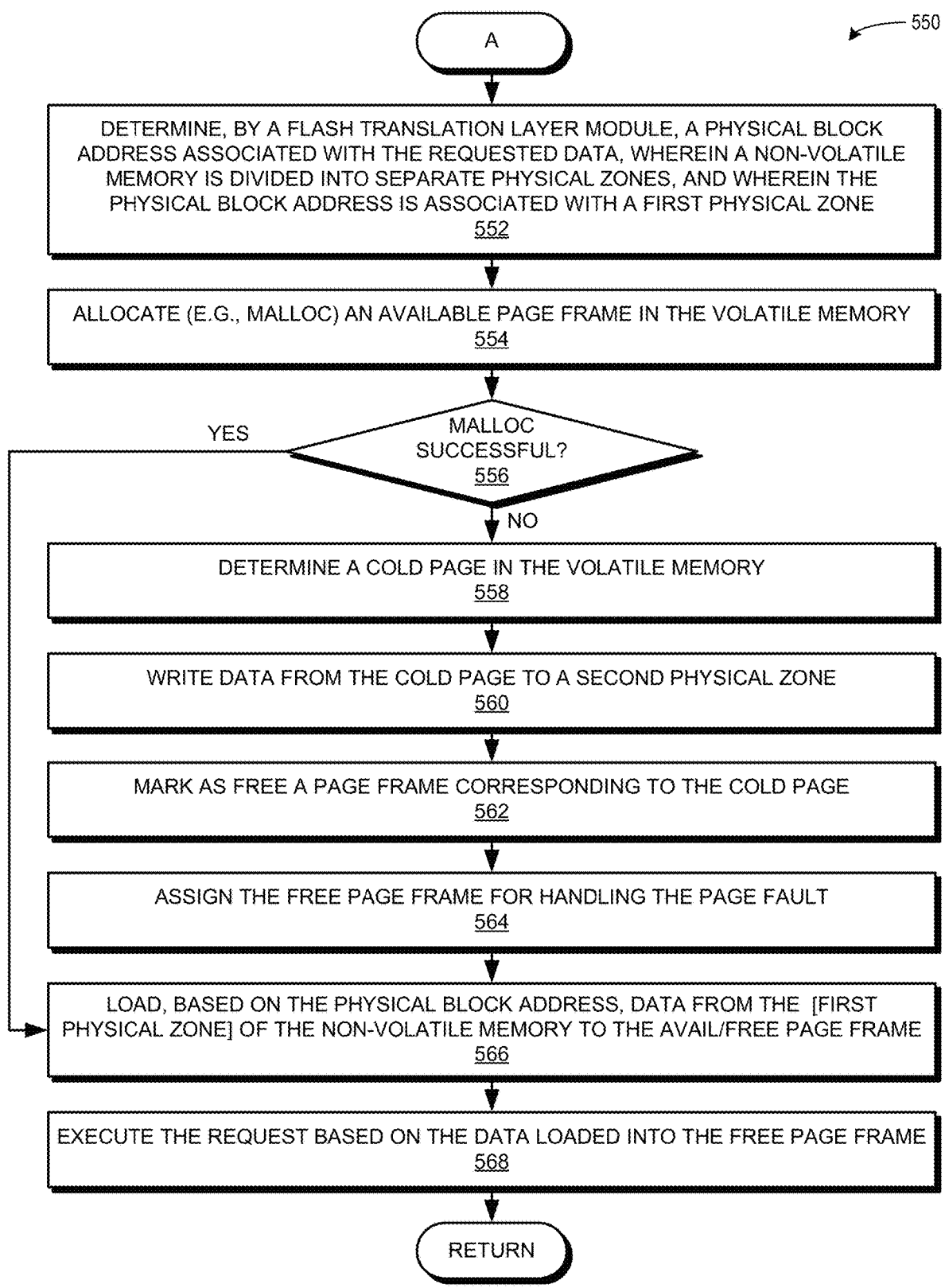
FIG. 5C presents a flowchart illustrating a method for facilitating operation of non-volatile memory, including moving cold pages from volatile memory to non-volatile memory, in accordance with an embodiment of the present application.

FIG. 5C presents a flowchart 550 illustrating a method for facilitating operation of non-volatile memory, including moving cold pages from volatile memory to non-volatile memory, in accordance with an embodiment of the present application. During operation, the system determines, by a flash translation layer module, a physical block address associated with the requested data (of operation 522), wherein a non-volatile memory is divided into separate physical zones, and wherein the physical block address is associated with a first physical zone (operation 552). The system allocates (e.g., malloc) an available page frame in the volatile memory (operation 554). If the malloc operation is successful (decision 556), the system loads, based on the physical block address, data from the first physical zone of the non-volatile memory to the available page frame (operation 566). If the malloc operation is not successful (decision 556), the system determines a cold page in the volatile memory (operation 558). The system can determine one or more cold pages in the volatile memory. A cold page is a page with a history of access which is less than a predetermined threshold, which can be based on a number of times that the page has been accessed with a predetermined period of time.

The system writes the data from the cold page to a second physical zone (operation 560). The second physical zone is separate from the first physical zone. The system marks as free a page frame corresponding to the cold page (operation 562). The system assigns the free page frame for handling the page fault (operation 564) (e.g., for handling the unsuccessful malloc of operation 556). The system loads, based on the physical block address, data from the first physical zone of the non-volatile memory to the free page frame (operation 566). The system executes the request based on the data loaded into the free page frame (operation 568, which is similar to operation 534).

Exemplary Computer System and Apparatus

Figure 6:
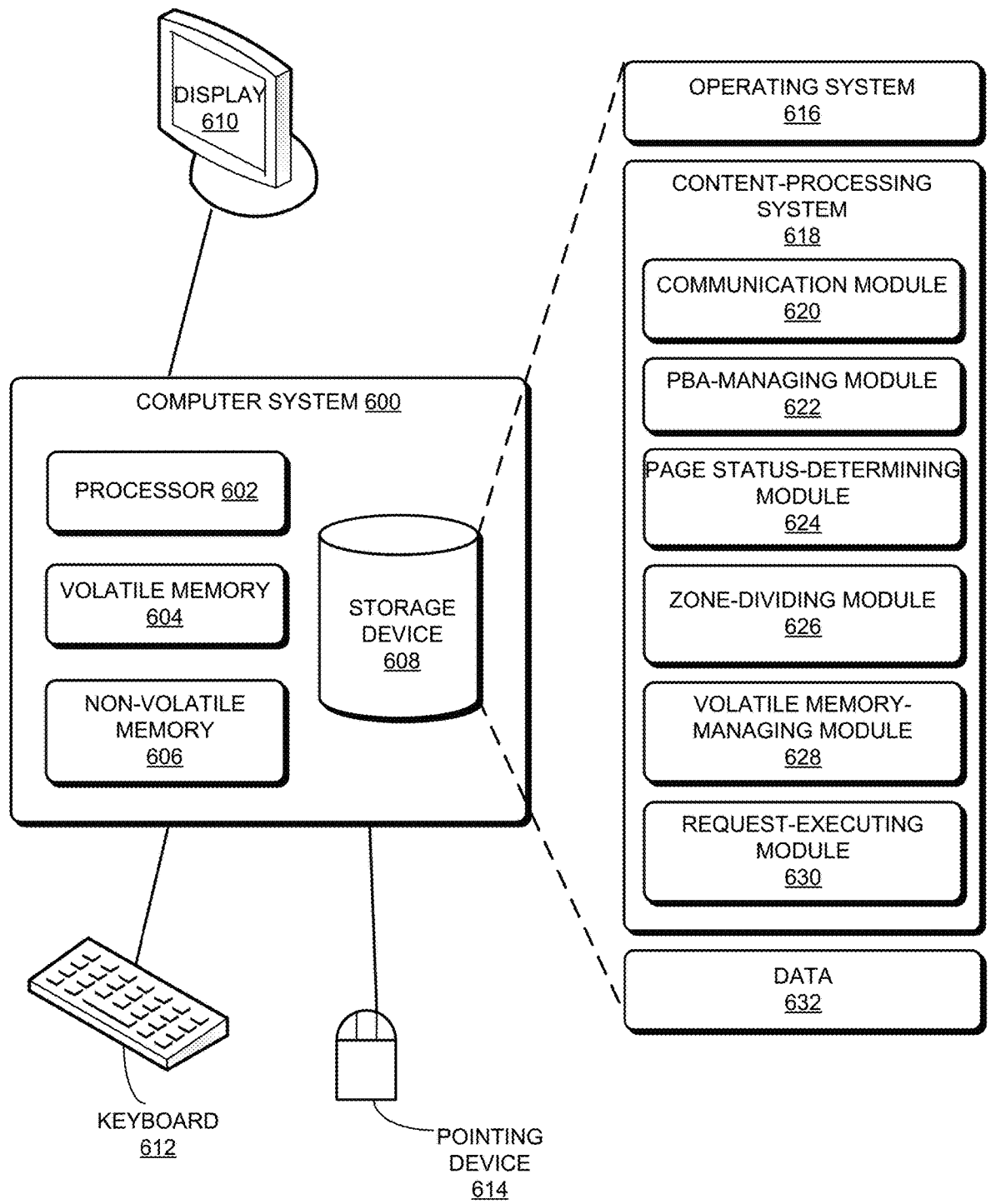
FIG. 6 illustrates an exemplary computer system that facilitates operation of non-volatile memory, in accordance with an embodiment of the present application.

FIG. 6 illustrates an exemplary computer system 600 that facilitates operation of non-volatile memory, in accordance with an embodiment of the present application. Computer system 600 includes a processor 602, a memory 604, and a storage device 608. Computer system 600 may be a computing device or a storage device. Volatile memory 604 can include memory (e.g., RAM) that serves as a managed memory, and can be used to store one or more memory pools. Non-volatile memory 606 can include memory (e.g., NAND flash) which is used for persistent storage. Furthermore, computer system 600 can be coupled to a display device 610, a keyboard 612, and a pointing device 614. Storage device 608 can store an operating system 616, a content-processing system 618, and data 632.

Content-processing system 618 can include instructions, which when executed by computer system 600, can cause computer system 600 to perform methods and/or processes described in this disclosure. For example, content-processing system 618 can include instructions for receiving and transmitting data packets, including a request to write or read data, data to be encoded and stored, or a block or a page of data.

Content-processing system 618 can further include instructions for determining, by a flash translation layer module, a physical block address associated with a first request which indicates data to be read (PBA-managing module 622). Content-processing system 618 can include instructions for obtaining a free page frame in a volatile memory by writing data from a cold page in the volatile memory to a second physical zone (volatile memory-managing module 628). Content-processing system 618 can also include instructions for loading, based on the physical block address, data from the non-volatile memory to the free page frame (communication module 620). Content-processing system 618 can include instructions for executing the request based on the data loaded into the free page frame (request-executing module 630).

Content-processing system 618 can additionally include instructions for dividing the non-volatile memory into the separate physical zones (zone-dividing module 626). Content-processing system 618 can include instructions for performing a first search in a TLB for an existing PBA, and performing a second search in a page table for the existing PBA (volatile memory-managing module 628). Content-processing system 618 can also include instructions for determining one or more cold pages in the volatile memory (page status-determining module 624).

Content-processing system 618 can further include instructions for determining one or more hot pages in the non-volatile memory (page status-determining module 624), and for loading, based on a physical block address for a hot page in the non-volatile memory, data from the non-volatile memory to the volatile memory (communication module 620). Content-processing system 618 can also include instructions for determining, by the flash translation layer module, another physical block address associated with a second request which indicates data to be written (PBA-managing module 622).

Data 632 can include any data that is required as input or that is generated as output by the methods and/or processes described in this disclosure. Specifically, data 632 can store at least: data to be stored, written, loaded, moved, retrieved, or copied; a block of data; a request; a request which indicates data to be read or written; a logical block address (LBA); a physical block address (PBA); an indicator of a status of a page or a page frame; a physical zone; an indicator of a physical zone; a translation lookaside buffer; a page table; an FTL in the user space; a cold page; a hot page; a predetermined threshold; a predetermined period of time; and a number of times that a page has been accessed within a predetermined period of time.

Figure 7:
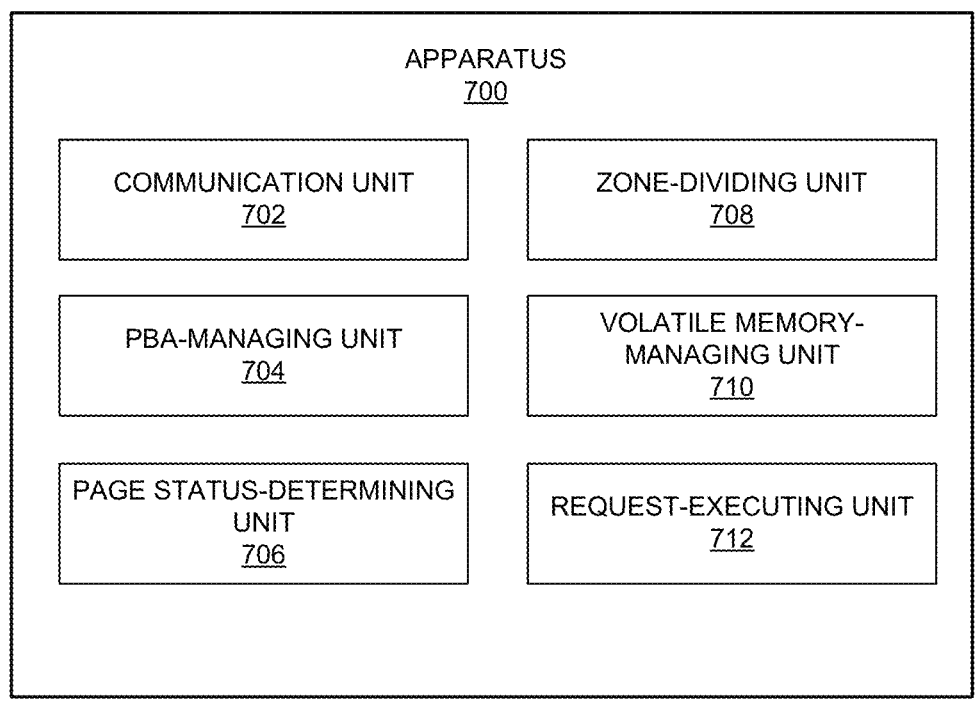
FIG. 7 illustrates an exemplary apparatus that facilitates operation of non-volatile memory, in accordance with an embodiment of the present application.

FIG. 7 illustrates an exemplary apparatus 700 that facilitates operation of non-volatile memory, in accordance with an embodiment of the present application. Apparatus 700 can comprise a plurality of units or apparatuses which may communicate with one another via a wired, wireless, quantum light, or electrical communication channel. Apparatus 700 may be realized using one or more integrated circuits, and may include fewer or more units or apparatuses than those shown in FIG. 7. Further, apparatus 700 may be integrated in a computer system, or realized as a separate device which is capable of communicating with other computer systems and/or devices. Specifically, apparatus 700 can comprise units 702-712 which perform functions or operations similar to modules 620-630 of computer system 700 of FIG. 7, including: a communication unit 802; a PBA-managing unit 804; a page status-determining unit 706; a zone-dividing unit 708; a volatile memory-managing unit 710; and a request-executing unit 712.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing embodiments described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A computer system for facilitating operation of non-volatile memory, the system comprising:
a processor; and
a memory coupled to the processor and storing instructions, which when executed by the processor cause the processor to perform a method, the method comprising:
assigning an application in a flash storage device to a first physical zone of a plurality of separate physical zones of the flash storage device,
wherein each physical zone has a dedicated application in the flash storage device to read or write data thereto;
determining, by a flash translation layer module, a first physical block address associated with a first request which indicates data to be read,
wherein the non-volatile memory comprises the flash storage device which is divided into the plurality of separate physical zones, and wherein the first physical block address is associated with the first physical zone;
determining, by the flash translation layer module, a second physical block associated with a second request which indicates data to be written,
wherein the second physical block address is associated with a second physical zone which is distinct from the first physical zone, and
wherein the first physical zone is processing the first read request;
determining a hot page in the non-volatile memory, wherein the hot page is a page with a history of access which is greater than a predetermined threshold, and wherein the predetermined threshold is based on a number of times that the page has been accessed within a predetermined period of time; and
loading, based on a physical block address for the hot page in the non-volatile memory, data from the non-volatile memory to the volatile memory.

2. The computer system of claim 1, wherein the method further comprises:
dividing the non-volatile memory into the separate physical zones,
wherein a separate physical zone includes one or more NAND dies, and
wherein an application corresponds to a unique physical zone.

3. The computer system of claim 1,
wherein the second physical zone is not currently processing a read operation or an erase operation.

4. The computer system of claim 1, wherein the method is performed in response to:
    performing an unsuccessful first search in a translation lookaside buffer for an existing physical block address in the volatile memory associated with the requested data; and
    performing an unsuccessful second search in a page table for the existing physical block address.

5. The computer system of claim 4, wherein in response to performing a successful first search in the translation lookaside buffer, or
    in response to performing the unsuccessful first search in the translation lookaside buffer and performing a successful second search in the page table, the method further comprises:
    executing the request based on data associated with the existing physical block address in the volatile memory.

6. The computer system of claim 1, wherein obtaining the free page frame in the volatile memory is responsive to successfully allocating an available page frame in the volatile memory.

7. The computer system of claim 1, wherein obtaining the free page frame and loading the data from the non-volatile memory to the free page frame is responsive to unsuccessfully allocating an available page frame in the volatile memory.

8. The computer system of claim 1, wherein the method further comprises:
    determining a cold page in a volatile memory, wherein the cold page is a page with a history of access which is less than a predetermined threshold, and wherein the predetermined threshold is based on a number of times that the page has been accessed within a predetermined period of time;
    obtaining a free page frame in the volatile memory by writing data from the cold page in the volatile memory to a second physical zone;
    loading, based on the physical block address, data from the non-volatile memory to the free page frame; and
    executing the request based on the data loaded into the free page frame.

9. The computer system of claim 1, wherein the flash translation layer module operates in a user space.

10. A computer-implemented method for facilitating operation of non-volatile memory, the method comprising:
    assigning an application in a flash storage device to a first physical zone of a plurality of separate physical zones of the flash storage device,
    wherein each physical zone has a dedicated application in the flash storage device to read or write data thereto;
    determining, by a flash translation layer module, a first physical block address associated with a first request which indicates data to be read,
    wherein the non-volatile memory comprises the flash storage device which is divided into the plurality of separate physical zones, and wherein the first physical block address is associated with the first physical zone;
    determining, by the flash translation layer module, a second physical block associated with a second request which indicates data to be written,
    wherein the second physical block address is associated with a second physical zone which is distinct from the first physical zone, and
    wherein the first physical zone is processing the first read request;
    determining a hot page in the non-volatile memory, wherein the hot page is a page with a history of access which is greater than a predetermined threshold, and wherein the predetermined threshold is based on a number of times that the page has been accessed within a predetermined period of time; and
    loading, based on a physical block address for the hot page in the non-volatile memory, data from the non-volatile memory to the volatile memory.

11. The method of claim 10, further comprising:
    dividing the non-volatile memory into the separate physical zones,
    wherein a separate physical zone includes one or more NAND dies, and
    wherein an application corresponds to a unique physical zone.

12. The method of claim 10,
    wherein the second physical zone is not currently processing a read operation or an erase operation.

13. The method of claim 10, wherein the method is performed in response to:
    performing an unsuccessful first search in a translation lookaside buffer for an existing physical block address in the volatile memory associated with the requested data; and
    performing an unsuccessful second search in a page table for the existing physical block address.

14. The method of claim 13, wherein in response to performing a successful first search in the translation lookaside buffer, or
    in response to performing the unsuccessful first search in the translation lookaside buffer and performing a successful second search in the page table, the method further comprises:
    executing the request based on data associated with the existing physical block address in the volatile memory.

15. The method of claim 10, wherein obtaining the free page frame in the volatile memory is responsive to successfully allocating an available page frame in the volatile memory.

16. The method of claim 10, wherein obtaining the free page frame and loading the data from the non-volatile memory to the free page frame is responsive to unsuccessfully allocating an available page frame in the volatile memory.

17. The method of claim 10, further comprising:
    determining a cold page in a volatile memory, wherein the cold page is a page with a history of access which is less than a predetermined threshold, and wherein the predetermined threshold is based on a number of times that the page has been accessed within a predetermined period of time;
    obtaining a free page frame in the volatile memory by writing data from the cold page in the volatile memory to a second physical zone;
    loading, based on the physical block address, data from the non-volatile memory to the free page frame; and
    executing the request based on the data loaded into the free page frame.

18. The method of claim 10, wherein the flash translation layer module operates in a user space.

* * * * *